(12) United States Patent
Spitzer

(10) Patent No.: US 6,931,152 B2
(45) Date of Patent: Aug. 16, 2005

(54) METHOD FOR IMPROVED AUTOMATIC PARTIAL COLOR CONSTANCY CORRECTION

(75) Inventor: Hedva Spitzer, Tel Aviv (IL)

(73) Assignee: Ramot At Tel Aviv University Ltd., Tel Aviv (IL)

( * ) Notice: Subject to any disclaimer, the term of this patent is extended or adjusted under 35 U.S.C. 154(b) by 644 days.

(21) Appl. No.: 09/953,205

(22) Filed: Sep. 17, 2001

(65) Prior Publication Data

US 2003/0053688 A1 Mar. 20, 2003

(51) Int. Cl.⁷ .............................. G06K 9/00; G06K 9/36
(52) U.S. Cl. ....................................... 382/167; 382/276
(58) Field of Search ................................ 382/162, 164, 382/167, 191, 210, 264, 276, 284; 358/1.9, 515, 518, 523; 348/679; 715/722

(56) References Cited

U.S. PATENT DOCUMENTS

| | | | | |
|---|---|---|---|---|
| 5,771,311 A | * | 6/1998 | Arai | 382/162 |
| 5,771,312 A | | 6/1998 | Spitzer | |
| 5,909,291 A | * | 6/1999 | Myers et al. | 358/523 |
| 5,963,201 A | * | 10/1999 | McGreggor et al. | 715/722 |
| 6,668,078 B1 | * | 12/2003 | Bolle et al. | 382/164 |
| 2002/0167615 A1 | * | 11/2002 | Spitzer et al. | 348/679 |
| 2003/0002059 A1 | * | 1/2003 | Zaklika et al. | 358/1.9 |

OTHER PUBLICATIONS

Dahari et al, "Spatiotemporal Adaptation Model for Retinal Ganlion Cells", *J. Opt. Soc. Am.*, 13(3):415–435, 1996.
Jobson et al, "A Multiscale Retinex for Bridging the Gap Between Color Images and the Human Observation of Scenes", *IEEE Trans. On Image Processing*, 6(7):965–976, 1997.
Spitzer et al, "Color Constancy: A Biological Model and Its Application for Still and Video Images", *Pattern Recognition*, 35(8):1645–1659, 2002.
Jobson et al, "Properties of a Center/Surround Retinex Part Two: Surround Design", *NASA Techbical Memorandum*, NASA, Huntsfield, Ala. Pp 1–13, 1995.
Moore et al, "A Real–Time Neural System for Color Constancy", *IEEE Trans. On Neural Networks*, 2(2):237–247, 1991.

* cited by examiner

*Primary Examiner*—Andrew W. Johns
*Assistant Examiner*—Amir Alavi
(74) *Attorney, Agent, or Firm*—G.E. Ehrlich (1995) Ltd.

(57) ABSTRACT

A method for providing partial color constancy of a stimulus represented by an array of picture elements each represented by a color spectrum. The method comprising: (a) assigning to each picture element in the array, for each color, a color value, thereby to provide a plurality of pre-processed single color images each respectively arranged as a series of pre-processed color values one at each picture element; (b) for each picture element, defining at least two regions of picture elements; (c) at each picture element, adapting each one of the pre-processed color values using pre-processed color values from at least one of the two regions of picture elements, thereby to form, at each picture element, a set of center response values; and (d) at each picture element, transforming the set of center response values into a set of center corrected color values, using response values from the two regions of picture elements to provide a plurality of processed single color images having partial color constancy.

118 Claims, 4 Drawing Sheets

METHOD FOR IMPROVED AUTOMATIC PARTIAL COLOR CONSTANCY CORRECTION

FIELD AND BACKGROUND OF THE INVENTION

The present invention relates to image processing and, more particularly, to a method for performing automatic color constancy (CC) correction of real images and for video sequences without knowledge of either the color or the intensity of the illumination.

A colored object absorbs most of the spectrum of the illuminating light that falls on the surfaces of the object and reflects only a narrow range of the spectrum, which is interpreted as the color of the object. Thus, an object appears dark, unless there is a light source which includes unabsorbed colors (wavelengths). White light includes a wide range of the visible spectrum, thus, the reflected spectrum from a colored object illuminated by a white light, is considered as the physically "true spectrum" of the object. Arbitrary chromatic (colored) illumination, however, contains only a partial range of the spectrum, which leads to a distortion of the object's color. For example, a completely blue object appears blue under white illumination, since it reflects the blue part and absorbs the green and red parts of the white light that falls on it. On the other hand, the same object appears dark under red illumination, as the light, which falls on the surfaces of the objects, is absorbed completely.

Through a phenomenon called "color constancy" (CC), the visual system has an ability to partially correct the perceived color of an object so that the perceived color remains more constant than would be expected by the spectral composition of the light reflected from it under varying colored illumination. For example, a human observer identifies a similar of an observed object both at noon, when daylight is predominantly bluish, and at sunset, when daylight is predominantly reddish. "Color constancy" is explained by the observation that the perceived color of an object, depends both on the spectral composition of the light reflected from it, and on the spatial distribution of other colored objects in the field of view. The suggested operation of the visual system is such that each patch of color and its surrounding area causes a response or a set of responses in the visual system, which later translate into a specific perceived color. Human CC is not perfect, and it is regarded as a partial capability for discounting illumination chromaticity.

The human observer is unable to achieve color constancy in a photographed image merely by using his visual system, as if had he been present at the photographed scene. As suggested by Hedva Spitzer and Sarit Semo in an article titled "Color Constancy: A Biological Model and its Application for Still and Video Images, accepted for publication in a journal named Pattern Recognition, the contents of which are hereby incorporated by reference, this unableness is due to the small visual angle of the image within his entire visual field. Hence, although the image is observed by a human visual system, an algorithm that can correct it to appear naturally is still necessary. Known means in the prior art for achieving "color constancy", i.e., partial correcting for departures from whiteness of the illuminating light, are described hereinbelow. Video cameras typically have manual means for achieving color constancy. These means require that the video camera be aimed manually at a reference surface that is assumed to be white under white illumination, to record parameters related to the spectrum of the illumination so that the subsequently recorded pictures may be corrected for the non-whiteness of the illumination. Furthermore, the illumination spectrum may change suddenly, for example, if a cloud passes in front of the sun, or if the object being photographed moves from sunlight to shade. These changes in illumination will affect the performance of the color constancy correction. More advanced video cameras often include automatic color constancy mechanisms, based on other principles such as color balancing by normalization, but these are not entirely satisfactory. Moreover, most of the prior art has an additional drawback that the problem of multiple sources of lighting is not solved.

U.S. Pat. No. 5,771,312, the contents of which are hereby incorporated by reference, discloses an advanced algorithm for partially correcting color images for colored illumination without knowledge of either the color or the intensity of the illumination. The algorithm takes into account the spatial distribution of other colored objects in the field of view, in a manner similar to that in which the neurons of the visual system process signals related to color vision to achieve color constancy. It was suggested that the retinal ganglion cells involved in color perception correspond to three kinds of cone cells that respond to color: red-processing cells, green-processing cells and blue-processing cells. On-center ganglion cells modify the cell response of chromatic light by subtracting surround responses from center responses. The mechanism is herein described: the on-center red-processing cells subtract green surround responses from red center responses, the on-center green-processing cells subtract red surround responses from green center responses and the on-center blue-processing cells subtract yellow surround responses from blue center responses. In addition, it is believed that at the ganglion cell level, the perception of color is further modified by responses from "remote" areas outside the receptive field that are even farther than the "surround" areas from the "center" areas. The algorithm imitates the above mechanisms of color perception to provide a partial color constancy correction for a color receptive field. However, the algorithm only has a limited capability for matching a perceived color of a patch presented in the center of a complex image with a reference patch presented on a neutral background. This limited capability is reflected in the inversion procedure which is used by the algorithm. Whereas in some embodiments of the above patent the surround area participates in the adaptation phase, the inversion phase does not take into account the surround area while translating the processed image into a perceived field level.

There is thus a widely recognized need for, and it would be highly advantageous to have, a more satisfactory method for performing color constancy correction, devoid of the above limitation.

SUMMARY OF THE INVENTION

According to a first aspect of the present invention there is provided a color constancy apparatus for providing partial color constancy of a stimulus arranged gridwise in a plurality of picture elements, each represented by a color spectrum resolvable into a plurality of individual colors over the grid, the apparatus comprising: an imager for resolving the spectrum into a plurality of pre-processed single color images each respectively arranged as a series of pre-processed color values one at each picture element; a corrector for partially correcting each of the pre-processed color values at each picture element by adapting each of the pre-processed color values into a center response value, using the pre-processed color values of picture elements from at least two regions of picture elements; and a transforming unit for transforming each of the center response values into a center corrected color value, using response values of picture elements from the two regions of picture elements, thereby to provide a processed image having partial color constancy.

According to a second aspect of the present invention there is provided a color-transform for providing color constancy the transform comprising:(a) an input for receiving a series of discrete response values representing color values at gridwise arranged input picture elements; (b) first grid region determination functionality to determine, for each the input picture element, a near region of closeby input picture elements having a plurality of surround input picture elements, and a remote region having a plurality of remote input picture elements; (c) second grid region determination functionality to determine, for each the input picture element, a target, the target comprising a center target picture element, a near region of closeby picture elements having a plurality of surround target picture elements, and a remote region having a plurality of remote target picture elements; (d) combining and transforming functionality operable on each the input picture element for: (i) combining at least two the response values, thereby providing a combined color code; and,(ii) transforming the combined color code into at least one target picture element thereby providing a set of corrected color values; thereby providing color constancy.

According to further features in preferred embodiments of the invention described below, the color constancy apparatus further comprising a saturator connected between the imager and the corrector for substitution of each the pre-processed color value of each the pre-processed single color image with a new pre-processed color value.

According to still further features in the described preferred embodiments the corrector comprises a convolutor for calculating by integration, for each the pre-processed single color image, a center processed function $G_c$.

According to still further features in the described preferred embodiments the convolutor further comprises electronic-calculating functionality for calculating by integration, for each said pre-processed single color image, a surround processed function $G_s$.

According to still further features in the described preferred embodiments the corrector further comprises an adapter for adapting the center processed function, to provide, at each picture element, a red center response value $R_r$, a green center response value $R_g$, and a blue center response value $R_b$.

According to still further features in the described preferred embodiments the adapter further comprises electronic-calculating functionality for adapting the surround processed function, to produce, at each picture element, a red surround response value $R_{s,r}$ and a green surround response value $R_{s,g}$.

According to still further features in the described preferred embodiments the corrector further comprises a subtractor for replacing each center response value with the combination of the center response value and the surround response value.

According to a third aspect of the present invention there is provided a color imaging device having a color constancy mechanism, the color constancy mechanism comprising: an imager for resolving a color spectrum into a plurality of pre-processed single color images each respectively arranged as a series of pre-processed color values one at each of a plurality of picture elements; a corrector for partially correcting each the pre-processed color value by adapting each the pre-processed color value into a center response value, using pre-processed color values of the picture elements from at least two regions of picture elements; and a transforming unit for transforming each of the center response values into a center corrected color value, using response values of picture elements from the two regions of picture elements, thereby to provide a processed image having partial color constancy.

According to further features in preferred embodiments of the invention described below, the color imaging device is a camera.

According to a fourth aspect of the present invention there is provided a method for providing partial color constancy of a stimulus represented by an array of picture elements each represented by a color spectrum the method comprising: assigning to each picture element in the array, for each color, a color value, thereby to provide a plurality of pre-processed single color images each respectively arranged as a series of pre-processed color values one at each picture element; for each picture element, defining at least two regions of picture elements; at each picture element, adapting each one of the pre-processed color values using pre-processed color values from at least one of the two regions of picture elements, thereby to form, at each picture element, a set of center response values; and at each picture element, transforming the set of center response values into a set of center corrected color values, using response values from the two regions of picture elements to provide a plurality of processed single color images having partial color constancy.

According to further features in preferred embodiments of the invention described below, the at least two regions of picture element comprise a first region of nearby picture elements and a second region of remote picture elements.

According to still further features in the described preferred embodiments the plurality of single color images comprises a red single color image, a green single color image and a blue single color image.

According to still further features in the described preferred embodiments the step of assigning to each picture element in the array, for each color, a color value, comprises resolving an overall colors spectrum with respect to the wavelength of each of the plurality of colors at each picture element.

According to still further features in the described preferred embodiments the adapting comprises using the second region for transforming each the pre-processed color value to a center remote value and combining the pre-processed color value with the center remote value.

According to still further features in the described preferred embodiments the method further comprises using the first region for transforming each the pre-processed color value to a center surround value and combining the pre-processed color value with the center surround value.

According to still further features in the described preferred embodiments transforming the center response values comprises combining at each picture element, at least two center response values.

According to still further features in the described preferred embodiments the picture element comprises at least one pixel.

According to still further features in the described preferred embodiments the array of picture elements comprises a two-dimensional rectangular grid of picture elements.

According to still further features in the described preferred embodiments the resolving comprises (a) at each picture element, multiplying the color spectrum by a response function of a red photoreceptor, to provide a red product, and integrating the red product, thereby providing a red pre-processed image; (b) at each picture element, multiplying the color spectrum by a response function of a green photoreceptor, to provide a green product, and integrating the green product, thereby providing a green pre-processed image; and (c) at each picture element, multiplying the color spectrum by a response function of a blue photoreceptor, to provide a blue product and integrating the blue product, thereby providing a blue pre-processed image; thereby providing at each picture element, a pre-processed red value, a pre-processed green value and a pre-processed blue value.

According to still further features in the described preferred embodiments the adapting each one of the color values comprises, for each picture element: for each the single color pre-processed image: transforming the pre-processed image to a center remote image; and combining the pre-processed image with the center remote image thereby providing at each picture element, a red center response value, $R_r$, a green center response value, $R_g$ and a blue center response value, $R_b$.

According to still further features in the described preferred embodiments the step of transforming comprises: (a) convoluting the pre-processed image with a center local spatial filter, thereby producing a center convoluted image constituting a center processed function, $G_c$; (b) convoluting the center convoluted image with a center remote spatial filter, thereby producing a center remote adaptation term, $\sigma_{c,r}$; (c) selecting a third center parameter $c_c$ and multiplying the center remote adaptation term $\sigma_{c,r}$ by the third center parameter $c_c$.

According to still further features in the described preferred embodiments the step of combining comprises: (a) selecting a first center parameter $a_c$; (b) selecting a second center parameter $b_c$; (c) setting a center local adaptation term, $\sigma_{c,l}$, equal to $(a_c-1) G_{c,b}+b_c$ where $G_{c,b}$ is a center adaptive function; (d) for each picture element, setting the center response value equal to $G_c/(G_c+\sigma_{c,l}+\sigma_{c,r})$.

According to still further features in the described preferred embodiments the center local spatial filter is a spatial decaying filter.

According to still further features in the described preferred embodiments the decaying is Gaussian decaying.

According to still further features in the described preferred embodiments the decaying is exponential decaying.

According to still further features in the described preferred embodiments the center remote spatial filter is a spatial decaying filter.

According to still further features in the described preferred embodiments the decaying is Gaussian decaying.

According to still further features in the described preferred embodiments the decaying is exponential decaying.

According to still further features in the described preferred embodiments the step (a) is preceded by the step of replacing each pre-processed color value, p, with $p/(p+p_0)$, where the $p_0$ is a constant.

According to still further features in the described preferred embodiments the step (a) is preceded by the step of replacing each pre-processed color value, p, with $p^n/(p^n+p_0)$, where the $p_0$ is a constant, and where the n is a curvature constant.

According to still further features in the described preferred embodiments the center adaptive function is identical to the center processed function.

According to still further features in the described preferred embodiments the method further comprising for each picture element and for each time, t: setting the center adaptive function equal to a time-convolution of a center adaptive low-pass temporal filter with the center processed function.

According to still further features in the described preferred embodiments the center adaptive low-pass temporal filter is equal to $\exp[(t'-t)/\tau_c]/\tau_{c,b}$, where the t' is a variable of the time-convolution, where the $\tau_c$ is a center low-pass temporal filter time constant and where the $\tau_{c,b}$ is a center decay time function.

According to still further features in the described preferred embodiments the center decay time function is a center decay time constant.

According to still further features in the described preferred embodiments the center decay time function is $$\tau_{c,b}=\tau_{c,m}/(1+|G_{c,b}-G_c|/G_{c,n}),$$

where the $\tau_{c,m}$ is an expected maximum value of the center decay time function, and where the $G_{c,n}$ is a normalization constant.

According to still further features in the described preferred embodiments the adapting each one of the color values comprises, for each picture element: for the red pre-processed image and the green pre-processed image transforming the pre-processed image to a surround remote image; and for the red pre-processed image and the green pre-processed image combining the pre-processed image with the surround remote image to provide a surround response value, $R_s$; thereby providing at each picture element, a red surround response value and a green surround response value.

According to still further features in the described preferred embodiments, the method comprises for each picture element: subtracting the green surround response value from the red center response value; subtracting the red surround response value from the green surround response value; combining the red surround response value and the green surround response value, thereby providing a yellow surround response value; and subtracting the yellow surround response value from the blue center response value.

According to still further features in the described preferred embodiments the step of transforming comprises: (a) convoluting the pre-processed image with a surround local spatial filter, thereby producing a surround convoluted image constituting a surround processed function, $G_s$; (b) convoluting the surround convoluted image with a surround remote spatial filter, thereby producing a surround remote adaptation term, $\sigma_{s,r}$; (c) selecting a third surround parameter $c_s$ and multiplying the surround remote adaptation term by the third surround parameter $c_s$.

According to still further features in the described preferred embodiments the step of combining comprises: (a) selecting a first surround parameter $a_s$; (b) selecting a second surround parameter $b_s$; (c) setting a surround local adaptation term, $\sigma_{s,l}$, equal to $(a_s-1) G_{s,b}+b_s$, where $G_{s,b}$ is a surround adaptive function; and (d) setting the surround response value equal to $G_s/(G_s+\sigma_{s,l}+\sigma_{s,r})$.

According to still further features in the described preferred embodiments, the surround local spatial filter is a spatial decaying filter.

According to still further features in the described preferred embodiments the decaying is Gaussian decaying.

According to still further features in the described preferred embodiments the decaying is exponential decaying.

According to still further features in the described preferred embodiments the surround remote spatial filter is a spatial decaying filter.

According to still further features in the described preferred embodiments the decaying is exponential decaying.

According to still further features in the described preferred embodiments the decaying is Gaussian decaying.

According to still further features in the described preferred embodiments the step (a) is preceded by the step of replacing each color value, p, with $p/(p+p_0)$, where the $p_0$ is a constant.

According to still further features in the described preferred embodiments the step (a) is preceded by the step of replacing each color value, p, with $p^n/(p^n+p_0)$, where the $p_0$ is a constant, and where the n is a curvature constant.

According to still further features in the described preferred embodiments the surround adaptive function is identical to the surround processed function.

According to still further features in the described preferred embodiments the method further comprises for each picture element and for each time, t: setting the surround adaptive function equal to a time-convolution of a surround adaptive low-pass temporal filter with the surround processed function.

According to still further features in the described preferred embodiments the surround decay time function is a surround decay time constant.

According to still further features in the described preferred embodiments the surround adaptive low-pass temporal filter is equal to $\exp[(t'-t)/\tau_s]/\tau_{s,b}$, where the t' is a variable of the time-convolution, where the $\tau_s$ is a surround low-pass temporal filter time constant and where the $\tau_{s,b}$ is a surround decay time function.

According to still further features in the described preferred embodiments the surround decay time function is $$\tau_{s,b} = \tau_{s,m}/(1+|G_{s,b}-G_s|/G_{s,n}),$$

where the $\tau_{s,m}$ is an expected maximum value of the surround decay time function, and where the $G_{s,n}$ is a normalization constant.

According to still further features in the described preferred embodiments the step of combining the red surround response value and the green surround response value comprises averaging the red surround response value and the green surround response value.

According to still further features in the described preferred embodiments the step of transforming the set of center response values into a set of center corrected color values comprises, (a) obtaining a remote picture element luminosity $Y_r$; (b) selecting a ratio coefficient CSR; (c) selecting a set of region parameters $a_c$, $a_s$, $b_c$, $b_s$, $c_c$ and $c_s$; (d) using the ratio coefficient, the remote picture element luminosity and the center response values for setting a set of eleven variables, δ and $z_j$, where the j is an integer-valued index ranging between 1 and 10; and (e) using the set of eleven variables, for assigning a set of center corrected color values.

According to still further features in the described preferred embodiments the step (a) comprises: (i) at each the picture element of the remote region of picture elements, multiplying the set of center response values by an XYZ transformation matrix, thereby providing a transformed XYZ vector, the transformed XYZ vector comprising a first component, a second component and a third component; and (ii) setting the value of the remote picture element luminosity equal to the sum of all the second components of the transformed XYZ vectors of the remote region of picture elements.

According to still further features in the described preferred embodiments the method comprises setting $z_1$ equal to $b_c+c_cY_r$,
$z_2$ equal to $b_s+c_sY_r$,
$z_3$ equal to $(a_s-a_c-R_ra_ca_s)$CSR,
$z_4$ equal to $(a_s-a_c-R_ga_ca_s)$CSR/$z_3$,
$z_5$ equal to $z_2(1-R_ra_c)$,
$z_6$ equal to $-z_1(1-R_ra_s)$CSR,
$z_7$ equal to $-R_rz_1z_2$,
$z_8$ equal to $-z_1(1+R_ga_s)$CSR$-z_4z_5$,
$z_9$ equal to $(z_4z_6-z_2(1-R_ga_c))/z_8$,
$z_{10}$ equal to $(z_4z_7+R_gz_1z_2)/z_8$, and
δ equal to $a_s+(2/\text{CSR})z_2/(R_{t,g}+R_{t,r})$.

According to still further features in the described preferred embodiments the step (e) comprises setting a center corrected green value, $R_{t,g}$, equal to:

$$-z_3z_{10}-z_5z_9-z_6+\sqrt{((z_3z_{10}+z_5z_9+z6)^2-4z_3z_9(z_5z_{10}+z_7))},$$

setting a center corrected red value, $R_{t,r}$, equal to:

$$z_9R_{t,g}+z_{10},$$

and setting a center corrected blue value, $R_{t,b}$, equal to:

$$z_1/((R_b+1/\delta)^{-1}-a_c).$$

According to still further features in the described preferred embodiments the method further comprises the step of replacing each center corrected color value, $R_t$, with $R_{t,0}R_t/(1-R_t)$, where the $R_{t,0}$ is a constant, thereby producing a pigment RGB response.

According to still further features in the described preferred embodiments the method further comprises the step of replacing each center corrected color value, $R_t$, with $(R_{t,0}R_t/(1-R_t))^{1/n}$, where the $R_{t,0}$ is a constant, and where n is a curvature constant, thereby producing a pigment RGB response.

According to still further features in the described preferred embodiments the method further comprises transforming the pigment RGB response $\vec{R}$ into a transformed color scale $\vec{X}$, using a transformation.

According to still further features in the described preferred embodiments the transformed color scale is an XYZ color scale.

According to still further features in the described preferred embodiments the transformation matrix is equal to $$\begin{pmatrix} 1.947 & -1.1601 & 0.2129 \\ 0.6612 & 0.3315 & 0.0073 \\ 0 & 0 & 1 \end{pmatrix}.$$

Implementation of the method and system of the present invention preferably involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

IN THE DRAWINGS

Figure 1:
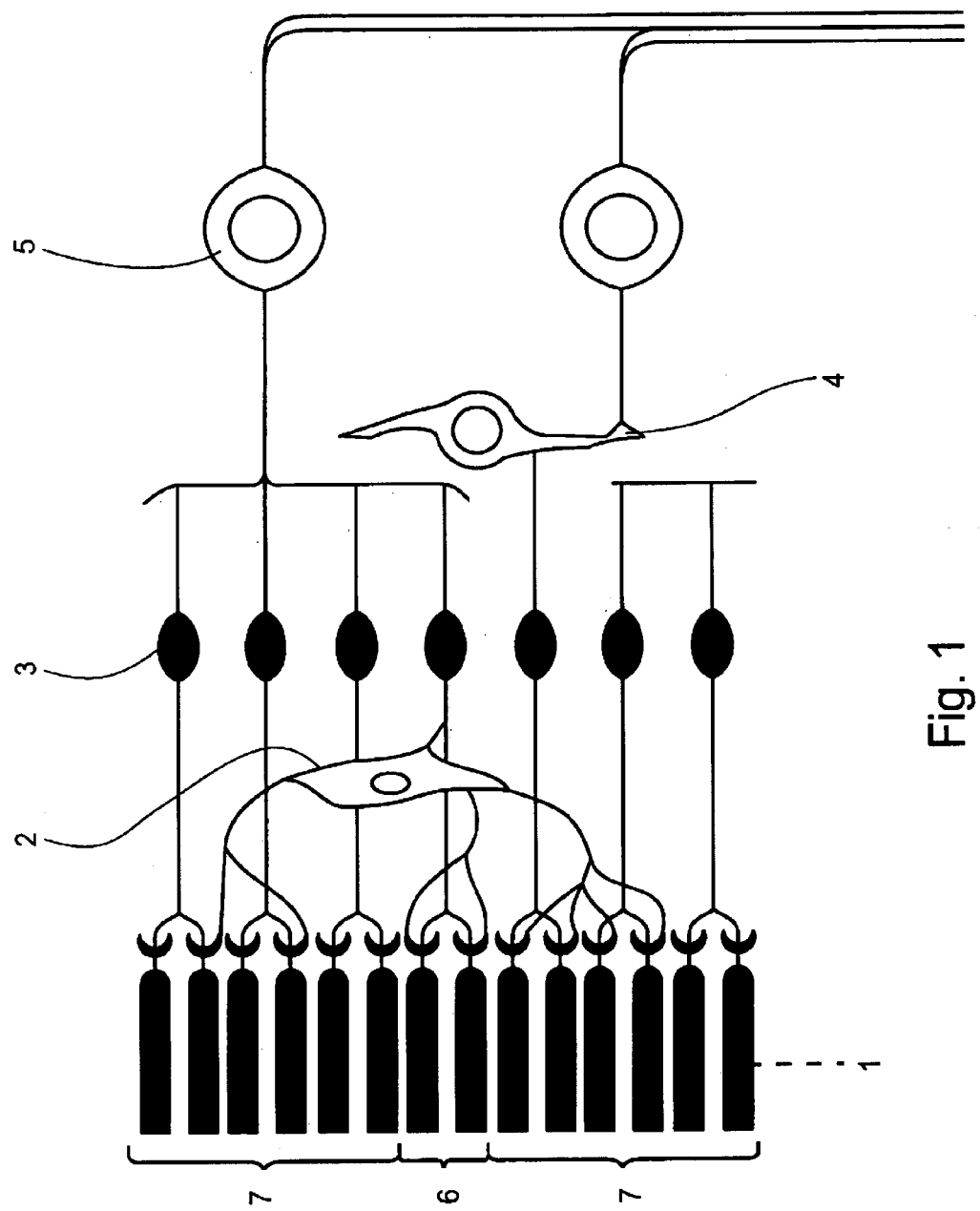
Figure 2A:
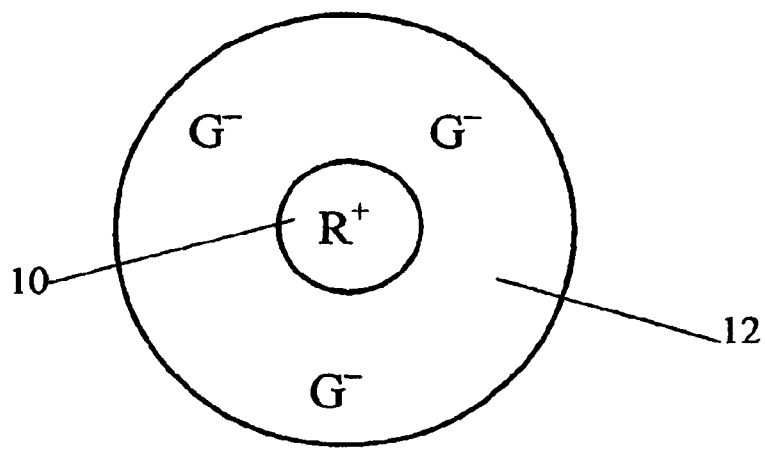
Figure 2B:
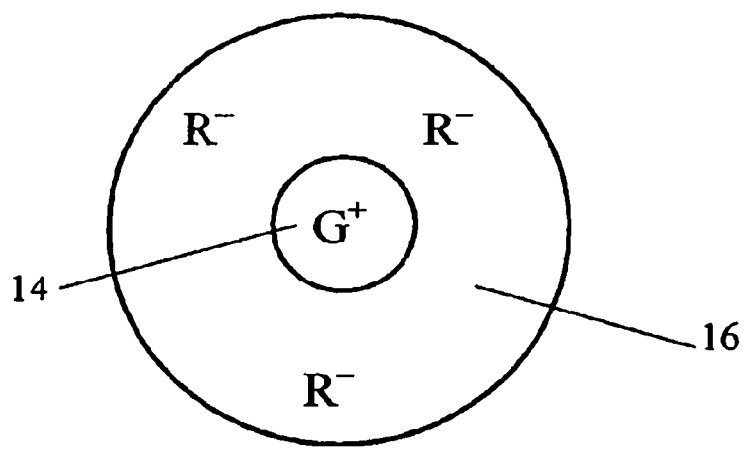
Figure 2C:
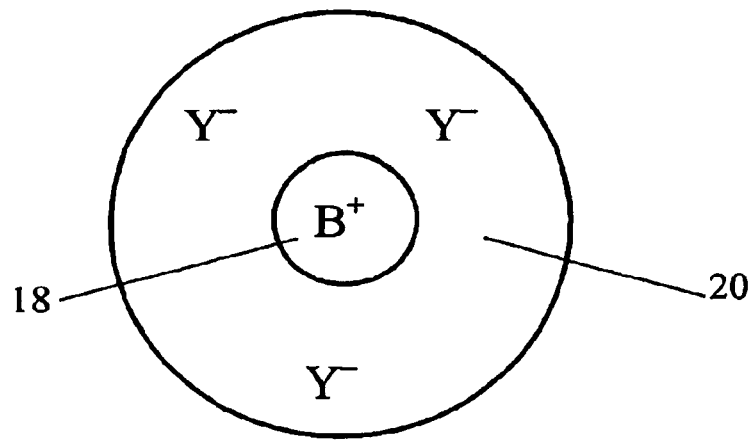
Figure 3:
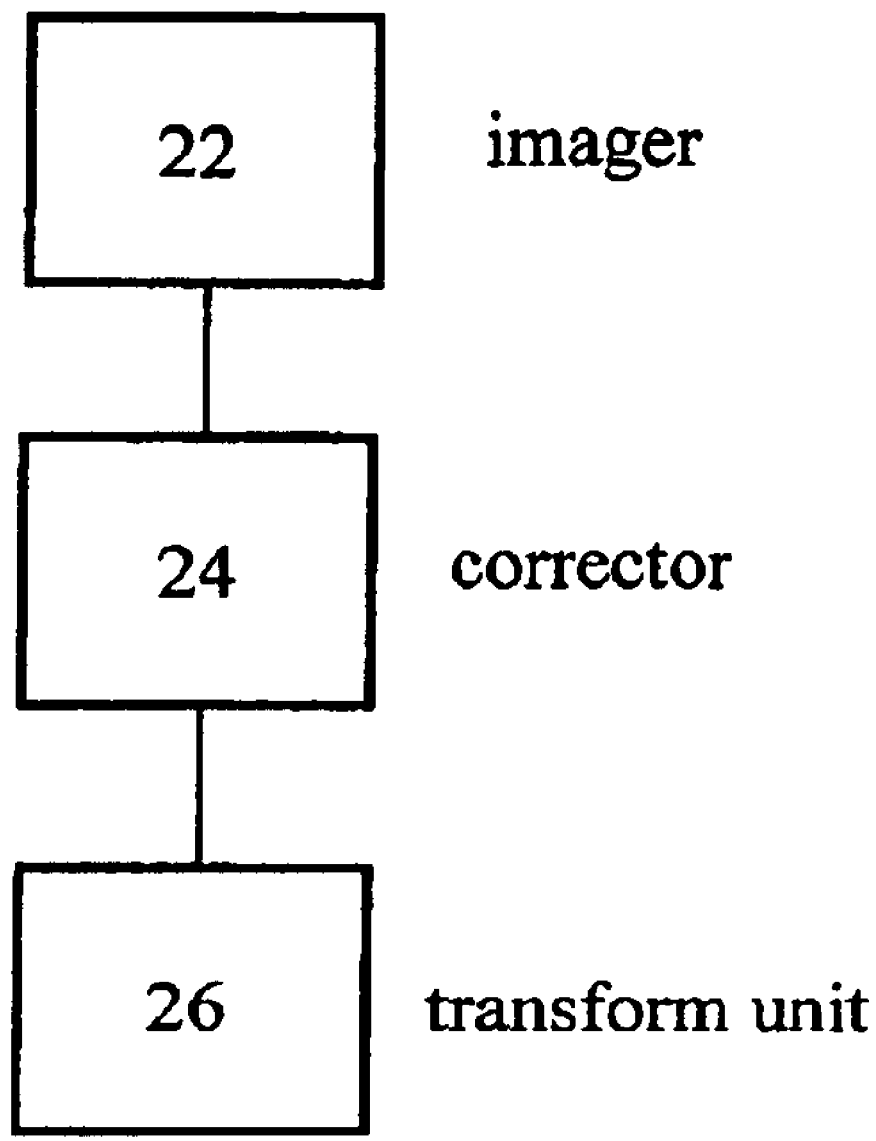
Figure 4:
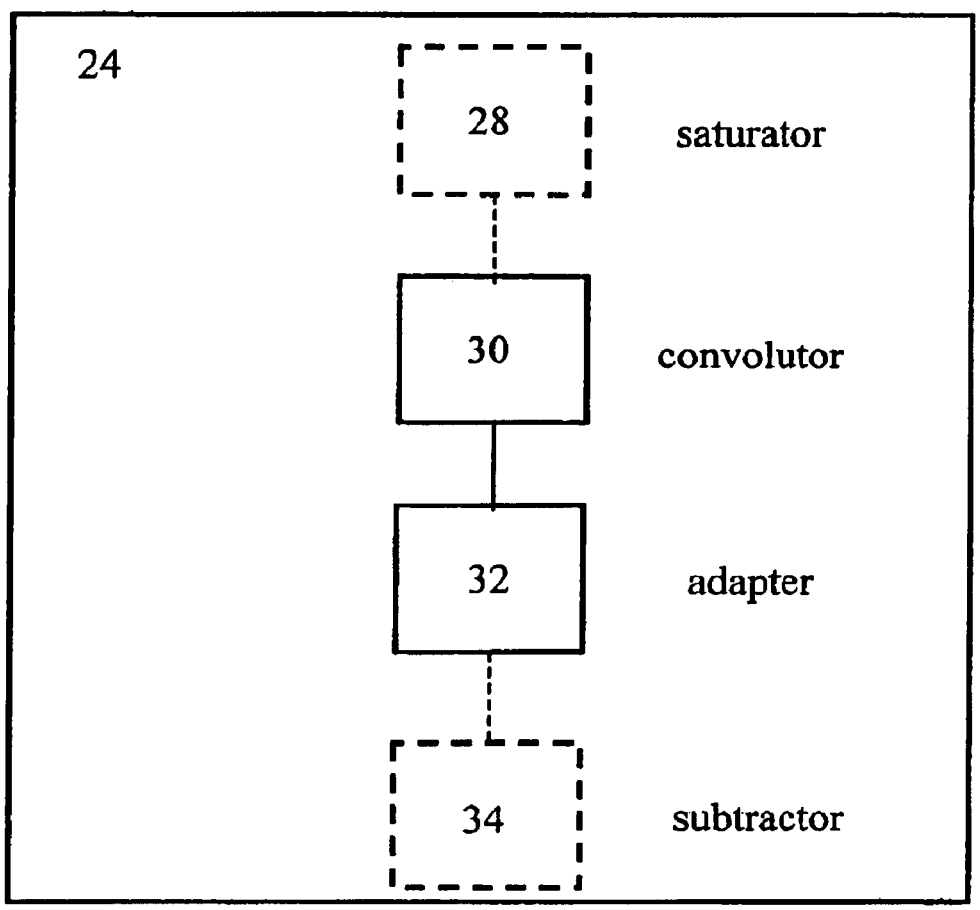

FIG. 1 is a schematic cross section of the human retina;

FIG. 2A is a receptive field processed by an on-center red-processing retinal ganglion cell;

FIG. 2B is a receptive field processed by an on-center green-processing retinal ganglion cell;

FIG. 2C is a receptive field processed by an on-center blue-processing retinal ganglion cell;

FIG. 3 is a simplified block diagram of a color balance device according to a first embodiment of the present invention;

FIG. 4 is a simplified block diagram of the corrector 24, which appears in FIG. 3;

DESCRIPTION OF THE PREFERRED EMBODIMENTS

The present invention comprises a method and apparatus for improving the emulation of the color constancy mechanism of visual perception. Specifically, the present invention can be used to improve the performance of a partial automatic color constancy correction of color pictures without knowledge of the illumination spectrum.

The principles and operation of color constancy correction according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For purposes of better understanding the present invention, as illustrated in FIGS. 3 and 4 of the drawings, reference is first made to the construction and operation of a the human retina as illustrated in FIGS. 1 and 2.

Referring now to the drawings, FIG. 1 illustrates a schematic cross section of the human retina, showing that the retina consists of five layers of cells, receptors 1, horizontal cells 2, bipolar cells 3, amacrine cells 4, and retinal ganglion cells 5. The receptive field of ganglion cells 5 includes both receptors 6 of the center receptive field area and receptors 7 of the nearby, referred to below as surround, receptive field area. The mechanism of color constancy operates in chromatic retinal ganglion cells 5, by subtracting surround color responses from center color responses. FIG. 2A shows schematically the receptive field processed by an on-center red-processing retinal ganglion cell 5 from center area receptors 6, showing that green surround response 12 from surround area receptors 7 is subtracted, after the adaptation process, from red center response 10. FIG. 2B shows schematically the receptive field processed by an on-showing that red surround response 16 from surround area receptors 7 is subtracted, after the adaptation process, from green center response 14. FIG. 2C shows schematically the receptive field processed by an on-center blue-processing retinal ganglion cell 5 from center area receptors 6, showing that yellow surround response 20, i.e., a combination of red surround response 16 and green surround response 12, is subtracted from blue center response 18, after the adaptation process. In addition, the perception of color is further modified by responses from "remote" areas of the receptive field that are even farther than the "surround" areas from the "center" areas. This is believed also to occur at the retinal ganglion cell level.

Reference is now made to FIG. 3, which is a simplified block diagram of a color constancy device according to a first embodiment of the present invention. FIG. 3 shows an imager 22 for resolving image information. The imager 22 is connected to a corrector 24, which uses color brightness information from several sources, as will be explained in more detail below, in order to perform a color constancy operation, thereby to produce responses of the image gathered by the imager 22. A transform unit 26 is connected to the corrector 24 to transform the responses, produced by the corrector 24, back into a corrected image.

Ideally, the input to the imager 22 is the color spectrum of a scene as a function of wavelength, measured at an array of picture elements. This ideal input rarely is attainable in practical systems. Therefore, the scope of the present invention includes the processing of images obtained by other means. For example, the image information may be in the form of analog signals from transducers whose spectral responses are similar to the spectral responses of cone cells in the retina, in which case the color values are electrical signals, typically voltage levels, which may be processed directly, using analog hardware. Alternatively, the analog signals may be digitized, and processed digitally according to the present invention. Often, however, the input to the imager 22 consists of digital images, such as are acquired by video cameras, that come ultimately from transducers whose spectral responses does not match the responses of cone cells. In that case, according to the preferred embodiment of the present invention, the digital images are transformed into photoreceptor response Long-Medium-Short wavelength coordinates (LMS), corresponding to the spectral responses of the three types of cone cells in the retina.

The most common color coordinate system for digital color images is the so-called Red-Green-Blue (RGB) coordinates which, according to some preferred embodiments of the present invention, may be the form of the input to imager 22. Other three-color schemes digital images, such as Yellow-Cyan-Magenta, may be transformed mathematically to RGB. The transformation from RGB coordinates, or from CIE XYZ coordinates, to photoreceptor coordinates may be found, for example, in G. Wyszecki and W. S. Styles, "Color Science" (Wiley, 1982), pages 139 and 615, the contents of which are hereby incorporated by reference. In what follows, all references to "red", "green" and "blue" will be to photoreceptor response coordinates, and not to chromaticity coordinates.

It is to be understood that references to an "image" herein are references to values at picture elements, treated collectively, as an array. Thus, the term "image" as used herein includes purely mathematical objects, and does not necessarily correspond to a physical image, although the original input images certainly do correspond to physical images.

In use, a stimulus represented by an array of picture elements each represented by a color spectrum is gathered by imager 22, as explained hereinabove. The stimulus as received is generally in a state of color imbalance. The imager resolves the spectrum into a set of pre-processed single color images, each arranged as an series of pre-processed color values, one at each picture element. Corrector 24 preferably uses color information gathered from a plurality of regions in order to achieve a color balanced response image, in a manner similar to that by which an on-center retinal ganglion cell responds to inputs from cone cells, as described above. The transform unit 26 uses, for each picture element, color information from nearby picture elements as well as from far picture elements in a manner that will be described in details hereinafter, infers what that response image would be if the average scene were predominantly gray, and inverts the transformation to produce partially corrected images. A computerized method used by the transform unit 26 is herein referred to as "the inverse function".

The embodiments described herein may provide enhancements to the above-mentioned U.S. Pat. No. 5,771,312, which attempts to treat the input red, green, and blue values as though they were the responses of red, green and blue cone cells. It then transforms those RGB values into a response image, and subsequently inverts the transformation. The improvement is to apply the inverse function, which improves the inversion process in order to produce partially corrected images.

According to the preferred embodiments of the present invention, the input to the inverse function used by the transform unit 26 is a grid of picture elements, which includes a plurality of response values at each picture elements. The method assumes that the above grid of response values is obtained, by taking into account the spatial distribution of other surrounding color readings in the field of view, in accordance with the human visual system. The above assumption is preferably embodied by using regional parameters, preferably attributed to each picture element in the grid, and a single coefficient, which is preferably attributed globally to the entire grid. According to the present embodiments, the inverse function uses the above coefficient and region parameters to construct, at each picture element, a set of variables and equations and to solve these equations to produce corrected images. In the forward direction, when considering surround and remote picture elements, the color is taken into consideration, however, in the inverse function the remote picture elements are considered achromatically. That is to say the recalculations of the inverse function do not consider remote color but rather the intensity.

The input to the inverse function is provided by the subsequent operation of the imager 22 and corrector 24. In order to illustrate two examples of the input to the inverse function, the forward transformations of digital still photography, as well as digital video photography, are herein described, with reference to the contents of U.S. Pat. No. 5,771,312. It is stressed that the description is by way of example and for the purpose of an illustrative discussion of the preferred embodiments of the present invention only.

The forward transformation used by the corrector 24 is performed on RGB values, to provide, at each picture element, a red center response value, a green center response value, and a blue center response value, with additional consideration of a remote correction, as described hereinafter. These above three center response values are constructed in way that corrects for the non-whiteness of the input image gathered by the imager 22. In some preferred embodiments of the present invention, a forward transformation is employed on the red and green images, to provide, at each picture element, a red surround response value and a green surround response value, again, with additional consideration of a remote correction, as described hereinafter. The above three surround response values are subtracted, using a subtraction procedure, from the center response values, in emulation of the above described action of on-center retinal ganglion cells of the human vision mechanism subsequently to the adaptation operation. According to the subtraction procedure: (a) the green surround response value is subtracted from the red center response value; (b) the red surround response value is subtracted from the green center response value; and (c) the red surround response value and the green surround response value are averaged to form a yellow response value, which is subtracted from the blue center response value.

Reference is now made to FIG. 4, which is a simplified block diagram of the corrector 24, which performs the forward transformation, according to some embodiments of the present invention. In FIG. 4, dotted blocks are to be understood as optional devices, and dotted lines are to be understood as optional connections between devices. FIG. 4 shows a saturator 28 for an optional step of saturating the pre-processed image, gathered and resolved by the imager 22. The saturator is connected to a convolutor 30 for convoluting the image, when the saturator 28 saturates the image. The convolutor 30 is connected to an adapter 32, which performs an adaptation operation on the output of the convolutor 30. The adapter 32 is optionally connected thereafter to a subtractor 34, in order to perform the optional subtraction procedure, described hereinabove, in accordance with some preferred embodiments of the present invention. As in U.S. Pat. No. 5,771,312, the first step of the forward transformation in the present invention is the operation of the convolutor 30 which transforms each pre-processed single color image to a "processed function" G, where G comprises a color index.

Herein, functions that are said to comprise a "color index", should be understood as having a corresponding subscript "r" (red), "g" (green) or "b" (blue), which has been omitted for brevity.

For each color, there is a center processed function $G_c$ and, optionally, a surround processed function $G_s$. Each of the three center processed functions, which are computed by convolutor 28, is calculated by convoluting the corresponding color image with a center local spatial decaying filter, thereby producing a center convoluted image whose picture element values are the required $G_c$'s. Similarly, in the preferred embodiment of the invention in which the surround area is to be considered, each of the three surround processed functions $G_s$, which are also computed by convolutor 28, is calculated by convoluting the corresponding color image with a surround local spatial decaying filter, thereby producing a surround convoluted image whose picture element values are the required $G_s$'s. The center local spatial decaying filter and the surround local spatial decaying filter can each independently be any mathematical decaying function such as, but not limited to, a Gaussian or an exponential function. For example, typical values of the radii of the Gaussian filters are 0.5 picture element for the center filter and 1.5 picture elements for the surround filter.

Optionally, prior to the above spatial filtering, the pre-processed color values resolved by imager 22 may be saturated by saturator 28, using the replacement p:=p$^n$/(p$^n$+p$_0$), where p represents a pre-processed color value, p$_0$ is a constant, n is a saturation rate constant, and ":=" represents replacement. A typical value for the constant n is between about 0.9 and about 1.

Adapter 32, according to the present invention, computes a response R for each color at each picture element from the corresponding processed function, using a Naka-Rushton-like equation, as will be discussed below, where R comprises a color index. The Naka-Rushton equation may be found, for example in an article of K. I. Naka and W. A. H. Rushton titled "S-Potentials from color units in the retina of fish", published in the Journal of Physiology, volume 185 pages 536–555 (1966). For each color, the center response is expressed by the adapter 32 in terms of the center processed function $G_c$:

$$R = G_c/(G_c + \sigma_{c,l} + \sigma_{c,r}),$$

where $\sigma_{c,l}$ is a center local adaptation term and $\sigma_{c,r}$ is a color center remote adaptation term that embodies the modification of the "center" response due to the "remote" response.

In the preferred embodiments of the present invention in which the subtraction procedure is employed by subtractor 34, the surround responses $R_s$ for the red and green colors are expressed by adapter 32 in terms of the surround processed functions $G_s$, similarly to the center responses:

$$R_s = G_s/(G_s + \sigma_{s,l} + \sigma_{s,r}).$$

Here, $\sigma_{s,l}$ is a surround local adaptation term, and $\sigma_{s,r}$ is a color surround remote adaptation term that embodies the modification of the "surround" response due to the "remote" response. Once the surround responses are calculated, subtractor 34 subtracts the surround responses from center responses, in accordance with the following formulae:

$$R_r' = R_r - R_{s,g}$$

$$R_g' = R_g - R_{s,r}$$

$$R_b' = R_b - (R_{s,r} + R_{s,b})/2.$$

Then, whether or not the center responses are adjusted by subtractor 34, the responses $R_r$, $R_g$ and $R_b$ supply the input for transform unit 26, which uses the inverse function to calculate the corrected color images which would have been the source of these responses. Before describing the preferred embodiments of the inverse function, the operation of the adapter 32, which calculates the adaptation terms σ is herein described, both for the center response calculation and for the surround response calculation, though in some preferred embodiments, the surround response is not to be calculated. The operation of adapter 32 in the present invention is simpler when applied to still photography, because time variation may be ignored ("steady state"). The method for computing the processed functions and the adaptation terms for still photography is described first.

The adapter 32, calculates the center local adaptation term using the following formula:

$$\sigma_{c,l} = (a_c - 1)G_c + b_c$$

where $a_c$ and $b_c$ are region parameters which may differ for two different picture elements. Similarly, the surround local adaptation term is calculated as $$\sigma_{s,l} = (a_s - 1)G_s + b_s$$

where $a_s$ and $b_s$ are region parameters which may differ for two different picture elements. Although the region parameters, used by the adapter 32, are mathematical parameters, they are based on electro-physiological findings. A known physiological phenomenon called 'curve shifting', is an effect in which the response curve is shifted after a certain amount of illumination has been viewed, leading to a transition into a new state of adaptation. The constants $a_c$ and $a_s$ determine the degree of curve-shifting, for example higher values $a_c$ and $a_s$ lead to higher shifting amount of the response curve. The combination between $a_c$ and $b_c$ and the combination between $b_s$ determine the illumination at which the gain is affected, in other words the region parameters serve as gain thresholds. A typical value of both $a_s$ and $a_c$ is between 2 and 8. A typical value of both $b_c$ and $b_s$ is between 0.01 and 0.2.

The remote adaptation terms are calculated by convoluting at each picture element the corresponding processed functions with a center remote spatial decaying filter and a surround remote spatial decaying filter, respectively. According to the present invention, the remote spatial decaying filters may be any spatial decaying function, such as, but not limited to, exponential functions or Gaussians. For example, for a two-dimensional rectangle grid, at a picture element with spatial coordinates (x,y), the center remote adaptation term is obtained from a convolution of G, with a center remote spatial exponential filter:

$$\sigma_{c,r} = c_c \int\int G_c(x',y')\exp(-r(x-x',y-y')/r_{0,c})dx'dy'$$

and the surround remote adaptation term is obtained from a convolution of $G_s$ with a surround remote spatial exponential filter:

$$\sigma_{s,r} = c_s \int\int G_s(x',y')\exp(-r(x-x',y-y')/r_{0,s})dx'dy'$$

where, in both remote spatial exponential filters, r(x,y) is Euclidean distance: sqrt(x$^2$+y$^2$), $c_c$ and $c_s$ are constant region parameters, and $r_{0,c}$ are $r_{0,s}$ are constant radii parameters. As can be understood from the definitions of $\sigma_{c,r}$ and $\sigma_{s,r}$ above, the 'c' parameters control the degree of remote adaptation. Typical values of the region parameters $c_c$ and $c_s$ are between 1 and 3. A typical value of the radii $r_{0,c}$ and $r_{0,s}$ is two-thirds of a linear dimension of the image, measured in numbers of picture elements.

As can be understood from the subscripts c for "center", s for "surround", and r for "remote" (r should not be confused with "red" as the adaptation terms σ do not comprise a color index, as explained above), the various spatial convolutions extend over different numbers of picture elements. The convolution for computing $G_c$ typically extends over one picture element i.e., the "convolution" actually is an inner-multiplication. The domain of the convolution for computing $G_s$ typically extends over eight picture elements immediately surrounding a target picture element, but may include the 16 picture elements immediately surrounding those eight picture elements, thereby extending over a total of 24 picture elements. The domain of the convolutions for computing the remote adaptation terms $\sigma_{c,r}$ and $\sigma_{s,r}$ typically extend over about half the image, but may extend over as few as the 24 picture elements that are the maximum for the "surround" convolution. For example, a typical remote adaptation domain for a 30×30 (900 picture elements total) image is 440 picture elements surrounding a single target picture element. At the boundaries of the images, all convolutions use periodic boundary conditions.

The operation of the adapter 32 in the present invention that is applied to digital video photography takes time variation into account, as in U.S. Pat. No. 5,771,312. The processed functions $G_c$ and $G_s$ are functions of time t, because the pre-processed single color images from which they are created vary in time. In addition to the spatial filters defined above, which are applied to entire images at a single value of t, adaptive temporal filters, as defined hereinbelow, are applied to these functions of t. These adaptive temporal filters are low-pass filters, comprising adaptive decay time functions being dependent both on time t and on the prior history of the functions to which they are applied.

The processed functions, $G_c(t)$ and $G_s(t)$ are convoluted with corresponding adaptive low-pass temporal filters $f_{c,b}(t)$ and $f_{s,b}(t)$, thereby producing center and surround adaptive functions $G_{c,b}(t)$ and $G_{s,b}(t)$, respectively. The adaptive low-pass temporal filters $f_{c,b}(t)$ and $f_{s,b}(t)$ preferably have the form:

$$f_{c,b}(t)=\exp(-t/\tau_c)/\tau_{c,b}(t), \text{ and}$$

$$f_{s,b}(t)=\exp(-t/\tau_s)/\tau_{s,b}(t),$$

where $\tau_{c,b}(t)$ and $\tau_{c,b}(t)$ are decay time functions and $\tau_c$ and $\tau_s$ are the center and surround low-pass temporal filter time constants, with typical values of 20 milliseconds. What makes these filters adaptive is that their associated decay time functions have explicit dependence on both time and the prior histories of $G_c$ and $G_s$. As known from physiological phenomena, the rate of the adaptation has a mild change as a function of signal magnitude, which rate may practically be considered as independent on signal magnitude. Hence, emulating the physiological process by applying a variable dynamic temporal filter on the processed function may diminish the dependence of the rate of the adaptation on signal magnitude. The preferred forms of the decay time functions $\sigma_{c,b}(t)$ and $\sigma_{c,b}(t)$ that describes the decay of the adaptive filter are:

$$\tau_{c,b}(t)=\tau_{c,m}/(1+|G_c(t)-G_{c,b}(t)|/G_n) \text{ and}$$

$$\tau_{s,b}(t)=\tau_{s,m}/(1+|G_s(t)-G_{s,b}(t)|/G_n).$$

where, $\tau_{c,m}$ and $\tau_{s,m}$ are the maximal expected values of $\tau_{c,b}(t)$ and $\tau_{s,b}(t)$, and $G_n$ is a normalization constant. A typical value of $\tau_{c,m}$ and $\tau_{s,m}$ is 500 milliseconds. It is stressed that despite being defined in terms of their own output, the adaptive functions are well-defined, because of the causal definition. Specifically, suppressing the c and s subscripts for brevity, the adaptive functions are computed as:

$$G_b(t)=\int G(t')f_b(t-t')dt', \text{ where } 0<t'<t.$$

Once the center and surround adaptive functions are calculated, the temporal adaptation terms $\sigma_{c,l}$ and $\sigma_{s,l}$, are computed, similarly to the steady state case, with adaptive functions replacing the processed functions. Specifically, $$\sigma_{c,l}(t)=(a_c-1)G_{c,b}(t)+b_c, \text{ and}$$

$$\sigma_{s,l}(t)=(a_s-1)G_{s,b}(t)+b_s.$$

Thus, both in the steady state example and in the dynamic (time dependent) example described hereinabove, the resultant grid of color codes includes a plurality of picture elements, each having a red response value $R_r$, a green response value $R_g$ and a blue response value $R_b$. These values are used by the transform unit 26 as the input to the inverse function. According to a preferred embodiment of the invention, it is assumed in the inversion process, that the perceived color for each color-coded picture element is related to the center region of its receptive field. As stated, the inverse function uses region parameters and coefficients while transforming the grid of color-codes to a grid of corrected images. The inversion process is equivalent to the human vision mechanism, in the sense that the corrected images are the perceived colors that would stimulate the retinal ganglion picture elements triplet to the same responses, with a uniform achromatic surface presented in their remote area. Thus, the inverse function resembles the common psychophysical procedure, in which the perceived color of a patch presented in the center of a complex image is determined by 'matching' it to a reference patch presented on a neutral background. Broadly stated, the inverse function, according to the present invention, updates, by a process described below, each response value of a grid, to a corrected color value, as if this corrected color value was in the center sub-region of the receptive field. This is done by using the response values of both the remote sub region and the surround sub region of each picture element. The resultant grid, having a corrected color value at each picture element is considered as the perceived color, so that color constancy is finally provided over the grid.

There is preferably one coefficient that is used by the inverse function, denoted CSR, which is taken to be the estimated ratio between the weights of the center sub region and the surround sub region. A typical value for CSR is 1.3. According to the preferred embodiment of the present invention, in the inversion process, achromatic luminosity values of the picture elements are used. The triplet color of each picture elements in the remote area is simply replaced with a singlet value, denoted $Y_r$, derived from the triplet color values in such a way as to represent the picture element luminosity. $Y_r$ can be calculated from any color scale such as, but not limited to, Long, Medium, Short (LMS) color scale or CIE XYZ color scale. For example, for a given triplet color vector (R,G,B), the value of the remote picture element luminosity $Y_r$ is the second component of a vector, obtained by multiplying the triplet color vector (R,G,B) by a transformation matrix. The transformation matrix can be found, for example, in G. Wyszecki and W. S. Styles, "Color Science" (Wiley, 1982), the contents of which are hereby incorporated by reference.

As stated, the inverse function selects region parameters, which are preferably $a_c$, $b_c$ and $c_c$ for the center sub region and $a_s$, $b_s$ and $c_s$ for the surround sub region. Typical values of $a_c$ and $a_s$ are between 2 and 8; typical values of $b_c$ and $b_s$ are between 0.01 and 0.2; and typical values of $c_c$ and $c_s$ are between 1 and 3.

According to the most preferred embodiment of the invention, a numerical value, which had been assigned in the forward transformation to a specific region parameter, is kept unchanged in the inversion process.

The first step of the inverse function is to apply a chromaticity on each picture element of the remote sub region, by using the remote picture element luminosity $Y_r$, as described above. As stated, the degree of remote adaptation is controlled by the third region parameters of the center sub region and the remote sub region, $c_c$ and $c_s$. Thus, the achromaticity is achieved by redefining the "c" parameters in the inversion process:

$$c_c' = c_c Y_r \text{ and } c_s' = c_s Y_r$$

where, as above, ":=" represent replacement. Once $Y_r$ is applied, the inverse function defines three independent variables, $z_1$, $z_2$ and $z_3$. Specifically, $$z_1 = b_c + c_c,$$

$$z_2 = b_s + c_s, \text{ and}$$

$$z_3 = (a_s - a_c - R_r a_c a_s) CSR.$$

These variables are then used to define seven additional variables, listed herein:

$$z_4 = (a_s - a_c - R_g a_c a_s) CSR / z_3,$$

$$z_5 = z_2 (1 - R_r a_c),$$

$$z_6 = -z(1 + R_r a_s) CSR,$$

$$z_7 = -R_r z_1 z_2,$$

$$z_8 = -z_1 (1 + R_g a_s) CSR - z_4 z_5,$$

$$z_9 = (z_4 z_6 - z_2 (1 - R_g a_c)) / z_8, \text{ and}$$

$$z_{10} = (z_4 z_7 + R_g z_1 z_2) / z_8,$$

The next step, according to the present embodiments is to construct a quadratic equation for the transformed green response, $R_{t,g}$, where the coefficients for the quadratic equation depend on the z variables defined above, $$z_3 z_9 R_{t,g}^2 + (z_3 z_{10} + z_5 z_9 + z_6) R_{t,g} + z_5 z_{10} + z_7 = 0.$$

The quadratic equation is then solved, and from the two solutions obtained the inverse function preferably chooses the larger solution.

The corrected green value is now used to calculate the corrected red value $R_{t,r}$, $$R_{t,r} = z_9 R_{t,g} + z_{10}.$$

The next step is to calculate the corrected blue value. This is done, according to the present invention by first combining the corrected green value and the corrected red value, to define an additional variable δ, $$\delta = a_s + (2/CSR) z_2 / (R_{t,g} + R_{t,r}),$$

and then, by using δ and the, as yet untransformed, value of the blue response $R_b$, to calculate the corrected blue value $R_{t,b}$, $$R_{t,b} = z_1 / ((R_b + 1/\delta)^{-1} a_c).$$

Optionally, two additional transformation are employed at this point on $R_{t,r}$, $R_{t,g}$, and $R_{t,b}$. Firstly, the pixel values are transformed into a pigment RGB response, using the inverse Naka Rushton equation:

$$p := (pp_0 / (1-p))^{1/n}.$$

According to the preferred embodiment of the invention, the above optional transformation can be done, whether or not the previously mentioned optional step of saturating the pre-processed color values before spatial filtering was taken in the forward transformation. Second, the pigment LMS responses are transformed into other color scales, such as, but not limited to XYZ values. The transformation from pigment RGB responses to XYZ values satisfies the following vector transformation:

$$\vec{X} = M \vec{R},$$

where $\vec{X}$ is the three-vector (X,Y,Z), $\vec{R}$ is the three-vector $(R_{t,r}, R_{t,g}, R_{t,b})$ and M is the transformation matrix:

$$M = \begin{pmatrix} 1.947 & -1.1601 & 0.2129 \\ 0.6612 & 0.3315 & 0.0073 \\ 0 & 0 & 1 \end{pmatrix}.$$

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for providing partial color constancy of a stimulus represented by an array of picture elements each represented by a color spectrum the method comprising:

assigning to each picture element in the array, for each color, a color value, thereby to provide a plurality of pre-processed single color images each respectively arranged as a series of pre-processed color values one at each picture element;

for each picture element, defining at least two regions of picture elements; at each picture element, adapting each one of said pre-processed color values using pre-processed color values from at least one of said two regions of picture elements, thereby to form, at each picture element, a set of center response values; and at each picture element, transforming said set of center response values into a set of center corrected color values, using response values from said two regions of picture elements to provide a plurality of processed single color images having partial color constancy.

2. The method of claim 1, wherein said at least two regions of picture element comprise a first region of nearby picture elements and a second region of remote picture elements.

3. The method of claim 2, wherein said plurality of single color images comprises a red single color image, a green single color image and a blue single color image.

4. The method of claim 3, wherein said step of assigning to each picture element in the array, for each color, a color value, comprises resolving an overall colors spectrum with respect to the wavelength of each of said plurality of colors at each picture element.

5. The method of claim 3, wherein said adapting comprises using said second region for transforming each said pre-processed color value to a center remote value and combining said pre-processed color value with said center remote value.

6. The method of claim 5, further comprising using said first region for transforming each said pre-processed color value to a center surround value and combining said pre-processed color value with said center surround value.

7. The method of claim 3, wherein said transforming said center response values comprises combining at each picture element, at least two center response values.

8. The method of claim 3, wherein said array of picture elements comprises a two-dimensional rectangular grid of picture elements.

9. The method of claim 8, wherein said resolving comprises
   (a) at each picture element, multiplying the color spectrum by a response function of a red photoreceptor, to provide a red product, and integrating said red product, thereby providing a red pre-processed image;
   (b) at each picture element, multiplying said color spectrum by a response function of a green photoreceptor, to provide a green product, and integrating said green product, thereby providing a green pre-processed image; and
   (c) at each picture element, multiplying said color spectrum by a response function of a blue photoreceptor, to provide a blue product and integrating said blue product, thereby providing a blue pre-processed image; thereby providing at each picture element, a pre-processed red value, a pre-processed green value and a pre-processed blue value.

10. The method of claim 8, wherein said adapting each one of said color values comprises, for each picture element: for each said single color pre-processed image:
    transforming said pre-processed image to a center remote image; and
    combining said pre-processed image with said center remote image thereby providing at each picture element, a red center response value, $R_r$, a green center response value, $R_g$ and a blue center response value, $R_b$.

11. The method of claim 10, wherein said step of transforming comprises:
    (a) convoluting said pre-processed image with a center local spatial filter, thereby producing a center convoluted image constituting a center processed function, $G_c$;
    (b) convoluting said center convoluted image with a center remote spatial filter, thereby producing a center remote adaptation term, $\sigma_{c,r}$;
    (c) selecting a third center parameter $c_c$ and multiplying said center remote adaptation term $\sigma_{c,r}$ by said third center parameter $c_c$.

12. The method of claim 11, wherein said center local spatial filter is a spatial decaying filter.

13. The method of claim 12, wherein said decaying is Gaussian decaying.

14. The method of claim 12, wherein said decaying is exponential decaying.

15. The method of claim 11, wherein said center remote spatial filter is a spatial decaying filter.

16. The method of claim 15, wherein said decaying is Gaussian decaying.

17. The method of claim 15, wherein said decaying is exponential decaying.

18. The method of claim 11, wherein said step (a) is preceded by the step of replacing each pre-processed color value, p, with $p/(p+p_0)$, where said $p_0$ is a constant.

19. The method of claim 11, wherein said step (a) is preceded by the step of replacing each pre-processed color value, p, with $p^n/(p^n+p_0)$, where said $p_0$ is a constant, and where said n is a curvature constant.

20. The method of claim 10, wherein said step of combining comprises:
    (a) selecting a first center parameter $a_c$;
    (b) selecting a second center parameter $b_c$;
    (c) setting a center local adaptation term, $\sigma_{c,l}$, equal to $(a_c-1) G_{c,b}+b_c$ where $G_{c,b}$ is a center adaptive function;
    (d) for each picture element, setting said center response value equal to $G_c/(G_c+\sigma_{c,l}+\sigma_{c,r})$.

21. The method of claim 20, wherein said center adaptive function is identical to said center processed function.

22. The method of claim 20, further comprising for each picture element and for each time, t: setting said center adaptive function equal to a time-convolution of a center adaptive low-pass temporal filter with said center processed function.

23. The method of claim 22, wherein said center adaptive low-pass temporal filter is equal to $\exp[(t'-t)/\tau_c]/\tau_{c,b}$, where said t' is a variable of said time-convolution, where said $\tau_c$ is a center low-pass temporal filter time constant and where said $\tau_{c,b}$ is a center decay time function.

24. The method of claim 23, wherein said center decay time function is $\tau_{c,b}=\tau_{c,m}/(1+|G_{c,b}-G_c|/G_{c,n})$, where said $\tau_{c,m}$ is an expected maximum value of said center decay time function, and where said $G_{c,n}$ is a normalization constant.

25. The method of claim 22, wherein said center decay time function is a center decay time constant.

26. The method of claim 8, wherein said adapting each one of said color values comprises, for each picture element:
    for said red pre-processed image and said green pre-processed image transforming said pre-processed image to a surround remote image; and
    for said red pre-processed image and said green pre-processed image combining said pre-processed image with said surround remote image to provide a surround response value, $R_s$;
thereby providing at each picture element, a red surround response value and a green surround response value.

27. The method of claim 26, further comprising for each picture element:
    subtracting said green surround response value from said red center response value;
    subtracting said red surround response value from said green surround response value;
    combining said red surround response value and said green surround response value, thereby providing a yellow surround response value; and
    subtracting said yellow surround response value from said blue center response value.

28. The method of claim 27, wherein said step of combining said red surround response value and said green surround response value comprises averaging said red surround response value and said green surround response value.

29. The method of claim 26, wherein said step of transforming comprises:
    (a) convoluting said preprocessed image with a surround local spatial filter, thereby producing a surround convoluted image constituting a surround processed function, $G_s$;
    (b) convoluting said surround convoluted image with a surround remote spatial filter, thereby producing a surround remote adaptation term, $\sigma_{s,r}$;

(c) selecting a third surround parameter $c_s$ and multiplying said surround remote adaptation term by said third surround parameter $c_s$.

30. The method of claim 29, wherein said surround local spatial filter is a spatial decaying filter.

31. The method of claim 30, wherein said decaying is Gaussian decaying.

32. The method of claim 30, wherein said decaying is exponential decaying.

33. The method of claim 29, wherein said surround remote spatial filter is a spatial decaying filter.

34. The method of claim 33, wherein said decaying is exponential decaying.

35. The method of claim 29, wherein said decaying is Gaussian decaying.

36. The method of claim 29, wherein said step (a) is preceded by the step of replacing each color value, p, with $p/(p+p_0)$, where said $p_0$ is a constant.

37. The method of claim 29, wherein said step (a) is preceded by the step of replacing each color value, p, with $p^n/(p^n+p_0)$, where said $p_0$ is a constant, and where said n is a curvature constant.

38. The method of claim 26, wherein said step of combining comprises:
    (a) selecting a first surround parameter $a_s$;
    (b) selecting a second surround parameter $b_s$;
    (c) setting a surround local adaptation term, $\sigma_{s,l}$, equal to $(a_s-1) G_{s,b}+b_s$, where $G_{s,b}$ is a surround adaptive function; and
    (d) setting said surround response value equal to $G_s/(G_s+\sigma_{s,l}+\sigma_{s,r})$.

39. The method of claim 38, wherein said surround adaptive function is identical to said surround processed function.

40. The method of claim 38, further comprising for each picture element and for each time, t: setting said surround adaptive function equal to a time-convolution of a surround adaptive low-pass temporal filter with said surround processed function.

41. The method of claim 40, wherein said surround decay time function is a surround decay time constant.

42. The method of claim 40, wherein said surround adaptive low-pass temporal filter is equal to $\exp[(t'-t)/\tau_s]/\tau_{s,b}$, where said $t'$ is a variable of said time-convolution, where said $\tau_s$ is a surround low-pass temporal filter time constant and where said $\tau_{s,b}$ is a surround decay time function.

43. The method of claim 42, wherein said surround decay time function is $\tau_{s,b}=\tau_{s,m}/(1+|G_{s,b}-G_s|/G_{s,n})$, where said $\tau_{s,m}$ is an expected maximum value of said surround decay time function, and where said $G_{s,n}$ is a normalization constant.

44. The method of claim 8, wherein said step of transforming said set of center response values into a set of center corrected color values comprises,
    (a) obtaining a remote picture element luminosity $Y_r$;
    (b) selecting a ratio coefficient CSR;
    (c) selecting a set of region parameters $a_c$, $a_s$, $b_c$, $b_s$, $c_c$ and $c_s$;
    (d) using said ratio coefficient, said remote picture element luminosity and said center response values for setting a set of eleven variables, $\delta$ and $z_j$, where said j is an integer-valued index ranging between 1 and 10; and
    (e) using said set of eleven variables, for assigning a set of center corrected color values.

45. The method of claim 44, wherein said step (a) comprises:
    (i) at each said picture element of said remote region of picture elements, multiplying said set of center response values by an XYZ transformation matrix, thereby providing a transformed XYZ vector, said transformed XYZ vector comprising a first component, a second component and a third component; and
    (ii) setting the value of said remote picture element luminosity equal to the sum of all said second components of said transformed XYZ vectors of said remote region of picture elements.

46. The method of claim 44, comprising setting
    said $z_1$ equal to $b_c+c_cY_r$,
    said $z_2$ equal to $b_c+c_sY_r$,
    said $z_3$ equal to $(a_s-a_c-R_ra_ca_s)CSR$,
    said $z_4$ equal to $(a_s-a_c-R_ga_ca_s)CSR/z_3$,
    said $z_5$ equal to $z_2(1-R_ra_c)$,
    said $z_6$ equal to $-z_1(1+R_ra_s)CSR$,
    said $z_7$ equal to $-R_rz_1z_2$,
    said $z_8$ equal to $-z_1(1+R_ga_s)CSR-z_4z_5$,
    said $z_9$ equal to $(z_4z_6-z_2(1-R_ga_c))/z_8$,
    said $z_{10}$ equal to $(z_4z_7+R_gz_1z_2)/z_8$, and
    said $\delta$ equal to $a_s+(2/CSR)z_2/(R_{t,g}+R_{t,r})$.

47. The method of claim 46, wherein said step (e) comprises setting a center corrected green value, $R_{t,g}$, equal to:

$-z_3z_{10}-z_5z_9-z_6+\sqrt{((z_3z_{10}+z_5z_9+z_6)^2-4z_3z_9(z_5z_{10}+z_7))}$, setting a center corrected red value, $R_{t,r}$, equal to:

$z_9R_{t,g}+z_{10}$, and setting a center corrected blue value, $R_{t,b}$, equal to:

$z_1/((R_b+1/\delta)^{-1}-a_c)$.

48. The method of claim 44, further comprising the step of replacing each center corrected color value, $R_t$, with $R_{t,0}R_t/(1-R_t)$, where said $R_{t,0}$ is a constant, thereby producing a pigment RGB response.

49. The method of claim 48, further comprising transforming said pigment RGB response $\vec{R}$ into a transformed color scale $\vec{X}$, using a transformation.

50. The method of claim 48, wherein said transformed color scale is an XYZ color scale.

51. The method of claim 50, wherein said transformation matrix is equal to $$\begin{pmatrix} 1.947 & -1.1601 & 0.2129 \\ 0.6612 & 0.3315 & 0.0073 \\ 0 & 0 & 1 \end{pmatrix}.$$

52. The method of claim 44, further comprising the step of replacing each center corrected color value, $R_t$, with $(R_{t,0}R_t/(1-R_t))^{1/n}$, where said $R_{t,0}$ is a constant, and where n is a curvature constant, thereby producing a pigment ROB response.

53. The method of claim 1, wherein said picture element comprises at least one pixel.

54. A color constancy apparatus for providing partial color constancy of a stimulus arranged gridwise in a plurality of picture elements, each represented by a color spectrum resolvable into a plurality of individual colors over said grid, the apparatus comprising:
- an imager for resolving the spectrum into a plurality of pre-processed single color images each respectively arranged as a series of pre-processed color values one at each picture element;
- a corrector for partially correcting each of said pre-processed color values at each picture element by adapting each of said pre-processed color values into a center response value, using said pre-processed color values of picture elements from at least two regions of picture elements; and
- a transforming unit for transforming each of said center response values into a center corrected color value, using response values of picture elements from said two regions of picture elements, thereby to provide a processed image having partial color constancy.

55. The color constancy apparatus according to claim 54, further comprising a saturator connected between said imager and said corrector for substitution of each said pre-processed color value of each said pre-processed single color image with a new pre-processed color value.

56. The color constancy apparatus according to claim 54, wherein said imager comprises electronic-calculating functionality for sorting said color spectrum with respect to the wavelength of each color at each picture element.

57. The color constancy apparatus according to claim 54, wherein said transforming unit comprises electronic-calculating functionality for combining at each picture element, at least two center response values.

58. The color constancy apparatus according to claim 54, wherein said picture element comprises at least one pixel.

59. The color constancy apparatus according to claim 54, wherein said plurality of pre-processed single color images are a red image, a green image and a blue image.

60. The color constancy apparatus according to claim 54, wherein said at least two regions of picture element comprise a first region of nearby picture elements and a second region of remote picture elements.

61. The color constancy apparatus according to claim 60, wherein said imager comprises electronic-calculating functionality for integrating the multiplication of the color spectrum of each picture element with a response function.

62. The color constancy apparatus according to claim 60, wherein said response function is selected from a group consisting of a response function of a red photoreceptor, a response function of a green photoreceptor and a response function of a blue photoreceptor.

63. The color constancy apparatus according to claim 60, wherein said saturator comprises electronic-calculating functionality for substitution of a new pre-processed color value for each existing pre-processed color value, in accordance with the formula $p/(p+p_0)$, where said $p_0$ is a constant and where p is said existing pre-processed color value.

64. The color constancy apparatus according to claim 60, wherein said saturator comprises electronic-calculating functionality for substitution of a new pre-processed color value for each existing pre-processed color value, in accordance with the formula $p^n/(p^n+p_0)$, where said $p_0$ is a constant, where p is said existing pre-processed color value and where said n is a curvature constant.

65. The color constancy apparatus according to claim 60, wherein said corrector comprises a convolutor for calculating by integration, for each said pre-processed single color image, a center processed function $G_c$.

66. The color constancy apparatus according to claim 65, wherein said convolutor further comprises electronic-calculating functionality for calculating by integration, for each said pre-processed single color image, a surround processed function $G_s$.

67. The color constancy apparatus according to claim 66, wherein surround processed function is in accordance with the formula $G_s = \int\int f_s(x,y)I(x,y)dxdy$, where said I is said pre-processed single color image and where said $f_s$ is a surround local spatial filter.

68. The color constancy apparatus according to claim 67, wherein said surround local spatial filter is a spatial decaying filter.

69. The color constancy apparatus according to claim 68, wherein said decaying is Gaussian decaying.

70. The color constancy apparatus according to claim 68, wherein said decaying is exponential decaying.

71. The color constancy apparatus according to claim 65, wherein said corrector further comprises an adapter for adapting said center processed function, to provide, at each picture element, a red center response value $R_r$, a green center response value $R_g$, and a blue center response value $R_b$.

72. The color constancy apparatus according to claim 71, wherein said adapter further comprises electronic-calculating functionality for adapting said surround processed function, to produce, at each picture element, a red surround response value $R_{s,r}$ and a green surround response value $R_{s,g}$.

73. The color constancy apparatus according to claim 72, wherein said corrector further comprises a subtractor for replacing each center response value with the combination of said center response value and said surround response value.

74. The color constancy apparatus according to claim 73, wherein said combination is in accordance with the following formulae:

$$R_r' = R_r - R_{s,g},$$
$$R_g' = R_g - R_{s,r},$$
$$R_b' = R_b - (R_{s,r} + R_{s,b})/2.$$

75. The color constancy apparatus according to claim 72, wherein said adapting is in accordance with the formula: $G_s/(G_s + \sigma_{s,l} + \sigma_{s,r})$, where said $\sigma_{s,l}$ is a surround local adaptation term, and where said $\sigma_{s,r}$ is a surround remote adaptation term.

76. The color constancy apparatus according to claim 75, wherein said surround local adaptation tert is in accordance with the formula: $\sigma_{s,l} = (a_s - 1)G_{s,b} + b_s$, where said $G_{s,b}$ is a surround adaptive function and where $a_s$ and $b_s$ are a first and second surround region parameters.

77. The color constancy apparatus according to claim 76, wherein said surround adaptive function is accordance with the formula $G_{s,b} = G_s$.

78. The color constancy apparatus according to claim 76, wherein said surround adaptive function is a function of time t, in accordance with the formula $G_{s,b}(t) = \int G_s(t')\exp[(t'-t)/\tau_s]/\tau_{s,b}dt'$, where said $\tau_s$ is a surround low-pass temporal filter time constant and where said $\tau_{s,b}$ is a surround decay time function.

79. The color constancy apparatus according to claim 78, wherein said surround decay time function is a surround decay time constant.

80. The color imaging device according to claim 79, wherein said transforming unit further comprises electronic-calculating functionality operable on each said picture element for combining each response value with said response values of said two regions of picture elements.

81. The color imaging device according to claim 80, wherein said two regions are a remote region and a nearby region.

82. The color constancy apparatus according to claim 78, wherein said surround decay time function is a function of time t, in accordance with the formula $\tau_{s,b}=\tau_{s,m}/(1+|G_{s,b}-G_s|/G_{s,n})$, where said $\tau_{s,m}$ is an expected maximum value of said surround decay time function, and where said $G_{s,n}$ is a normalization constant.

83. The color constancy apparatus according to claim 75, wherein said surround remote adaptation term is in accordance with the formula:

$$\sigma_{s,r}=c_s\iint G_s(x',y')\exp(-\text{sqrt}(x-x')^2+(y-y')^2)/r_{0,s})dx'dy',$$

where said $c_s$ is a third surround region parameter, and where said $r_{0,s}$ is a surround radius parameter.

84. The color constancy apparatus according to claim 71, wherein said adapting is in accordance with the formula: $G_c/(G_c+\sigma_{c,l}+\sigma_{c,r})$, where said $\sigma_{c,l}$ is a center local adaptation term, and where $\sigma_{c,r}$ is a center remote adaptation term.

85. The color constancy apparatus according to claim 84, wherein said center local adaptation term is in accordance with the formula: $\sigma_{c,l}=(a_c-1)G_{c,b}+b_c$, where said $G_{c,b}$ is a center adaptive function and where $a_c$ and $b_c$ are a first and second center region parameters.

86. The color constancy apparatus according to claim 85, wherein said center adaptive function is accordance with the formula $G_{c,b}=G_c$.

87. The color constancy apparatus according to claim 85, wherein said center adaptive function is a function of time t, in accordance with the formula $G_{c,b}(t)=\int G_c(t')\exp[(t'-t)/\tau_c]/\tau_{c,b}dt'$, where said $\tau_c$ is a center low-pass temporal filter time constant and where said $\tau_{c,b}$ is a center decay time function.

88. The color constancy apparatus according to claim 87, wherein said center decay time function is a center decay time constant.

89. The color constancy apparatus according to claim 87, wherein said center decay time function is a function of time t, in accordance with the formula $\tau_{c,b}=\tau_{c,m}/(1+|G_{c,b}-G_c|/G_{c,n})$, where said $\tau_{c,m}$ is an expected maximum value of said center decay time function, and where said $G_{c,n}$ is a normalization constant.

90. The color constancy apparatus according to claim 84, wherein said center remote adaptation term is in accordance with the formula: $\sigma_{c,r}=c_c\iint G_c(x',y')\exp(-\text{sqrt}((x-x')^2+(y-y')^2)/r_{0,c})dx'dy'$, where said $c_c$ is a third center region parameter and where said $r_{0,c}$ is a center radius parameter.

91. The color constancy apparatus according to claim 65, wherein said center processed function is in accordance with the formula $G_c\iint f_c(x,y)I(x,y)dxdy$, where said $I$ is said pre-processed single color image and where said $f_c$ is a center local spatial filter.

92. The color constancy apparatus according to claim 91, wherein said center local spatial filter is a spatial decaying filter.

93. The color constancy apparatus according to claim 92, wherein said decaying is Gaussian decaying.

94. The color constancy apparatus according to claim 92, wherein said decaying is exponential decaying.

95. The color constancy apparatus according to claim 60, wherein said transforming unit comprises electronic-calculating functionality for setting eleven variables, $\delta$ and $z_j$, where said j is an integer-valued index ranging between 1 and 10.

96. The color constancy apparatus according to claim 95, wherein said transforming unit further comprising electronic-calculating functionality for selecting a set of region parameters $a_c$, $a_s$, $b_c$, $b_s$, $c_c$ and $c_s$, and an electronic storing-recalling functionality for storing and recalling said set of region parameters.

97. The color constancy apparatus according to claim 95, wherein said transforming unit further comprising electronic-calculating functionality for selecting a ratio coefficient and an electronic storing-recalling functionality for storing and recalling said ratio coefficient.

98. The color constancy apparatus according to claim 97, wherein said transforming unit further comprising a multiplier for obtaining a remote picture element luminosity $Y_r$.

99. The color constancy apparatus according to claim 98, wherein said multiplier comprises electronic-calculating functionality for:
(i) multiplying said set of center response values of each said picture element of said remote region of picture elements by an XYZ transformation matrix, to provide a transformed XYZ vector, said transformed XYZ vector comprising a first component, a second component and a third component; and
(ii) setting setting the value of said remote picture element luminosity equal to the sum of all said second components of said transformed XYZ vectors of said remote region of picture elements.

100. The color constancy apparatus according to claim 99, wherein said transforming unit further comprises electronic-calculating functionality for making a value of: a center corrected red value, $R_{t,r}$, a center corrected green value, $R_{t,g}$, and a center corrected blue value, $R_{t,b}$, in accordance with the following formulae:

$$R_{t,g}=-z_3z_{10}-z_5z_9-z_6+\sqrt{(z_3z_{10}+z_5z_9+z_6)^2-4z_3z_9(z_5z_{10}+z_7))},$$

$$R_{t,r}=z_9R_{t,g}+z_{10},$$

$$R_{t,b}=z_1/(R_b+1/\delta)^{-1}-a_c).$$

101. The color constancy apparatus according to claim 100, wherein transforming unit further comprises electronic-calculating functionality for transforming each said center corrected color value into a pigment RGB response, in accordance with the formula $R_{t,0}R_t/(1-R_t)$ where $R_t$ is a center corrected color value and where $R_{t,0}$ is a constant.

102. The color constancy apparatus according to claim 101, wherein transforming unit further comprises electronic-calculating functionality for transforming said pigment RGB response into a transformed color scale, in accordance with the formula:

$$\vec{X}=M\vec{R},$$

where said $\vec{X}$ is a three-vector of said transformed color scale, where said $\vec{R}$ is the three-vector of a pigment RGB response and where M is a transformation matrix.

103. The color constancy apparatus according to claim 102, wherein said transformed color scale is an XYZ color scale.

104. The color constancy apparatus according to claim 103, wherein said transformation matrix equal to $$\begin{pmatrix} 1.947 & -1.1601 & 0.2129 \\ 0.6612 & 0.3315 & 0.0073 \\ 0 & 0 & 1 \end{pmatrix}.$$

105. The color constancy apparatus according to claim 100, wherein transforming unit further comprises electronic-calculating functionality for transforming each said center corrected color value into a pigment RGB response, in accordance with the formula $(R_{t,0}R_t/(1-R_t))^{1/n}$ where $R_t$ is a center corrected color value, where $R_{t,0}$ is a constant and where n is a curvature rate constant.

106. The color constancy apparatus according to claim 99, wherein said eleven variables are in accordance with the following formulae:

$$z_1 = b_c + c_c Y_r,$$

$$z_2 = b_s + c_s Y_r,$$

$$z_3 = (a_s - a_c - R_r a_c a_s) CSR,$$

$$z_4 = (a_s - a_c - R_g a_c a_s) CSR/z_3,$$

$$z_5 = z_2(1 - R_r a_c),$$

$$z_6 = -z_1(1 + R_r a_s) CSR,$$

$$z_7 = -R_r z_1 z_2,$$

$$z_8 = -z_1(1 + R_g a_s) CSR - z_4 - z_5,$$

$$z_9 = (z_4 z_6 - z_2(1 - R_g a_c))/z_8,$$

$$z_{10} = (z_4 z_7 + R_g z_1 z_2)/z_8, \text{ and}$$

$$\delta = a_s + (2/CSR) z_2/(R_{t,g} + R_{t,r}).$$

107. A color imaging device having a color constancy mechanism, the color constancy mechanism comprising:

an imager for resolving a color spectrum into a plurality of pre-processed single color images each respectively arranged as a series of pre-processed color values one at each of a plurality of picture elements;

a corrector for partially correcting each said pre-processed color value by adapting each said pre-processed color value into a center response value, using pre-processed color values of said picture elements from at least two regions of picture elements; and a transforming unit for transforming each of said center response values into a center corrected color value, using response values of picture elements from said two regions of picture elements, thereby to provide a processed image having partial color constancy.

108. The color imaging device according to claim 107, which is a camera.

109. The color imaging device according to claim 108, wherein said imager comprises electronic-calculating functionality for sorting said color spectrum with respect to the wavelength of each color at each picture element.

110. The color imaging device according to claim 108, wherein said corrector comprises electronic-calculating functionality for combining pre-processed color values of each picture element with pre-processed color values of close picture elements.

111. The color imaging device according to claim 110, wherein said corrector further comprises electronic-calculating functionality for combining pre-processed color values of each picture element with pre-processed color values of far picture elements.

112. The color imaging device according to claim 108, wherein said transforming unit comprises electronic-calculating functionality for combining at each picture element, at least two center response values.

113. The color imaging device according to claim 108, wherein said picture element comprises at least one pixel.

114. The color imaging device according to claim 108, wherein said plurality of single color pre-processed images are a red pre-processed image, a green pre-processed image and a blue pre-processed image.

115. The color imaging device according to claim 114, wherein said imager comprises electronic-calculating functionality for integrating the multiplication of said color spectrum of each picture element with a response function.

116. The color imaging device according to claim 114, wherein said corrector comprises electronic-calculating functionality for calculating by integration, a red center processed function $G_{c,r}$, a green center processed function $G_{c,g}$, a blue center processed function $G_{c,b}$, a red surround processed function $G_{s,r}$ and a green surround processed function $G_{s,g}$, each said processed function having a response value R at each picture element.

117. The color imaging device according to claim 116, wherein said corrector further comprises electronic-calculating functionality for replacing at least one response value with the combination of said center response value and said surround response value.

118. The color imaging device according to claim 117, wherein said combination of said center response value and said surround response value is in accordance with the following formulae:

$$R_r := R_{c,r} - R_{s,g},$$

$$R_g := R_{c,g} - R_{s,r},$$

$$R_b := R_{c,b} - (R_{s,r} + R_{s,b})/2.$$

* * * * *